US011724955B2

(12) United States Patent
Simpson

(10) Patent No.: US 11,724,955 B2
(45) Date of Patent: Aug. 15, 2023

(54) SUPEROMNIPHOBIC BULK OPTICAL GLASS

(71) Applicant: Waymo LLC, Mountain View, CA (US)

(72) Inventor: John T. Simpson, Sahuarita, AZ (US)

(73) Assignee: Waymo LLC, Mountain View, CA (US)

( * ) Notice: Subject to any disclaimer, the term of this patent is extended or adjusted under 35 U.S.C. 154(b) by 507 days.

(21) Appl. No.: 16/942,632

(22) Filed: Jul. 29, 2020

(65) Prior Publication Data

US 2022/0033295 A1 Feb. 3, 2022

(51) Int. Cl.
*C03C 3/06* (2006.01)
*C03C 15/00* (2006.01)
(Continued)

(52) U.S. Cl.
CPC .............. *C03C 3/061* (2013.01); *C03C 3/089* (2013.01); *C03C 4/00* (2013.01); *C03C 15/00* (2013.01); *C03C 17/30* (2013.01); *C03C 23/0095* (2013.01); *C03C 2204/00* (2013.01); *C03C 2217/76* (2013.01)

(58) Field of Classification Search
CPC .................................................. C03C 23/0095
See application file for complete search history.

(56) References Cited

U.S. PATENT DOCUMENTS 6,825,260 B2 11/2004 Sievers et al.
6,878,616 B1 4/2005 Casey et al.
(Continued)

FOREIGN PATENT DOCUMENTS

CN 103011589 4/2013
CN 203159434 8/2013
(Continued)

OTHER PUBLICATIONS

Hubert and Faber, "On the structural role of boron in borosilicate glasses," Phys. Chem. Glasses 55(3):136-158(23) (Jun. 2014).
(Continued)

*Primary Examiner* — David Sample
(74) *Attorney, Agent, or Firm* — McDonnell Boehnen Hulbert & Berghoff LLP

(57) ABSTRACT

A method for preparing an optically transparent, superomniphobic glass composition is described. In one aspect, the present disclosure provides a method for preparing a glass composition, including heating a borosilicate glass comprising 45-85 wt. % silicon oxide and 10-40 wt. % boron oxide to form a phase-separated glass comprising an interpenetrating network of silicon oxide domains and boron oxide domains. The method includes removing at least a portion of the boron oxide domains from the phase-separated glass and depositing a hydrophobic silane to provide a porous glass having a hydrophobic silane layer disposed on a portion of the surface thereof, a total pore volume of 15-50 vol. %, and an average pore diameter of 20-300 nm. The method includes, within at least a portion of the volume of the porous glass, forming an aerogel precursor, and converting at least a portion of the aerogel precursor to an aerogel.

20 Claims, 1 Drawing Sheet

(51) Int. Cl.
*C03C 17/30* (2006.01)
*C03C 3/089* (2006.01)
*C03C 4/00* (2006.01)
*C03C 23/00* (2006.01)

(56) References Cited

U.S. PATENT DOCUMENTS

| | | | |
|---|---|---|---|
| 7,737,189 | B2 | 6/2010 | Gaspar Martinho et al. |
| 8,003,579 | B2 | 4/2011 | Akarsu et al. |
| 8,277,899 | B2 | 10/2012 | Krogman et al. |
| 11,155,490 | B1 * | 10/2021 | Simpson ................. C03C 17/34 |
| 2006/0239886 | A1 * | 10/2006 | Nakayama ............. B01J 19/123 |
| | | | 423/335 |
| 2012/0107581 | A1 | 5/2012 | Simpson et al. |
| 2014/0116944 | A1 | 5/2014 | Hu et al. |
| 2014/0242375 | A1 * | 8/2014 | Mauro ................... C03B 17/02 |
| | | | 65/53 |
| 2015/0239773 | A1 * | 8/2015 | Aytug .................. C03C 17/008 |
| | | | 204/192.12 |
| 2019/0262861 | A1 | 8/2019 | Simpson |

FOREIGN PATENT DOCUMENTS

| | | |
|---|---|---|
| CN | 103285789 | 9/2013 |
| CN | 103708476 | 4/2014 |
| CN | 104140553 | 11/2014 |
| CN | 104446304 | 3/2015 |
| CN | 107603415 A | 1/2018 |
| CN | 107879610 | 4/2018 |
| CN | 109293248 | 2/2019 |
| EP | 3042884 | 7/2016 |
| JP | H11100223 | 4/1999 |
| JP | 2011251870 | 12/2011 |
| JP | 2015123592 | 7/2015 |
| WO | 2015/037513 A1 | 3/2015 |
| WO | WO-2016171558 A1 * | 10/2016 ........... C03C 25/007 |
| WO | 2021216304 A1 | 10/2021 |
| WO | 2021216305 A1 | 10/2021 |

OTHER PUBLICATIONS

Łagowska et al., "Glass transition effect in liquid silicate-borate-phosphate glasses," J Therm Anal. Calorim. 138:2251-2262 (Jun. 2019).

* cited by examiner

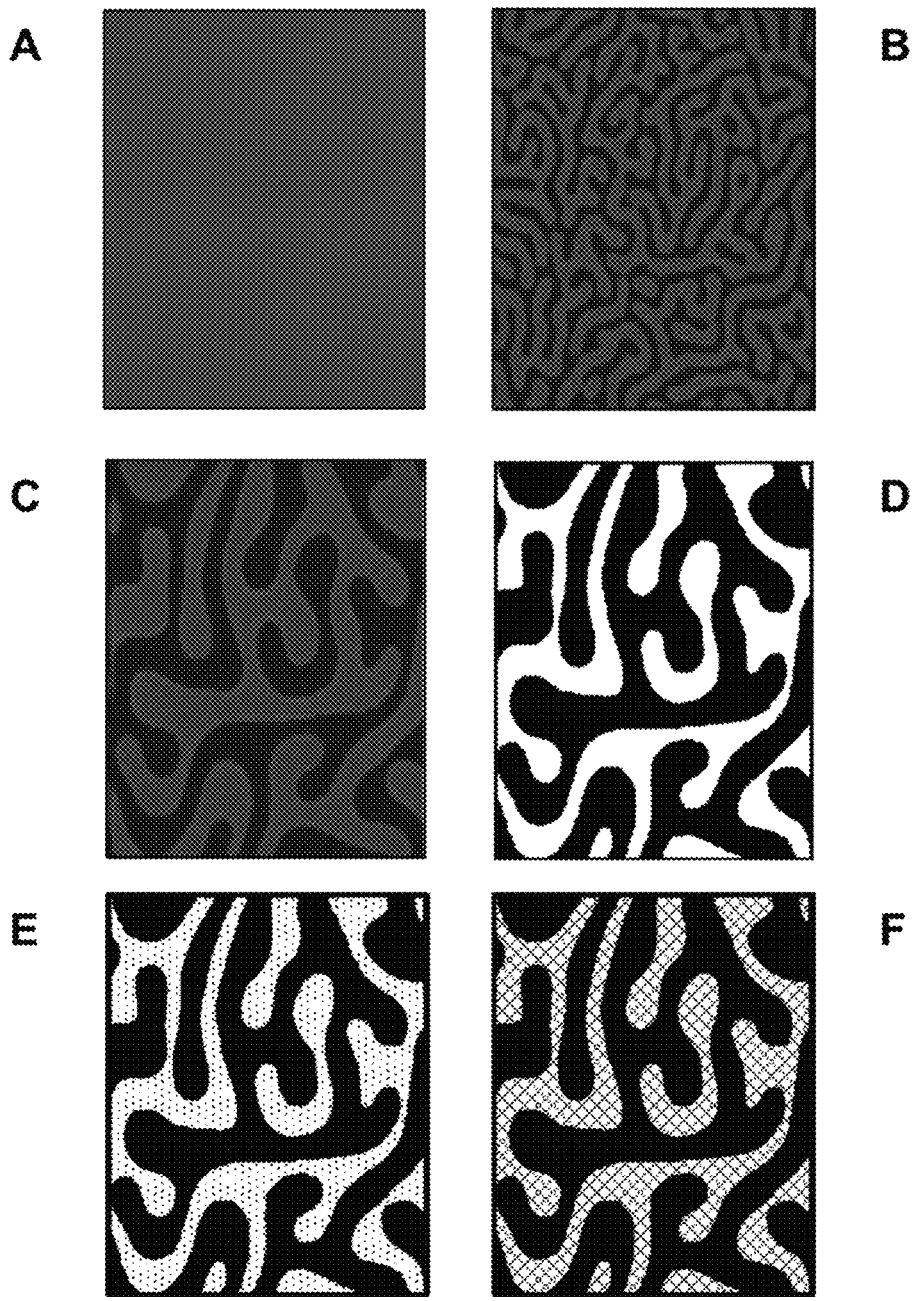

SUPEROMNIPHOBIC BULK OPTICAL GLASS

BACKGROUND

Unless otherwise indicated herein, the materials described in this section are not prior art to the claims in this application and are not admitted to be prior art by inclusion in this section.

Microporous superhydrophobic surfaces having exceptional water repellency properties have potential application in numerous fields of endeavor. However, such surfaces can be poorly repellant to oily materials (i.e., low oleophobicity), such as road grime (e.g., in automotive applications). Though superomniphobic materials having exceptional water and oil repellency properties have been achieved, such materials have micron-scale roughness, and accordingly can be difficult to keep clean (e.g., from "bug splats"). Moreover, such materials are often susceptible to shear force.

Moreover, where bulk materials are required, such surfaces typically must be applied as a coating to a bulk substrate. The resulting coating-substrate interface can significantly limit the durability and optical clarity of the coated material. Because materials with high optical clarity tend to have low surface roughness, bonding between a superomniphobic coating and an optically clear bulk substrate (e.g., glass) can be relatively weak, and therefore susceptible to shear forces, "bug splats," etc.

Accordingly, there remains a need for optically transparent, superomniphobic bulk materials that are durable and relatively easy to keep clean.

SUMMARY

In one aspect, the present disclosure provides a method for preparing a glass composition, comprising
  heating a borosilicate glass comprising 45-85 wt. % silicon oxide and 10-40 wt. % boron oxide to form a phase-separated glass comprising an interpenetrating network of silicon oxide domains and boron oxide domains;
  removing at least a portion of the boron oxide domains from the phase-separated glass and depositing a hydrophobic silane to provide a porous glass having
    a hydrophobic silane layer disposed on a portion of the surface thereof;
    a total pore volume of 15-50 vol. %; and
    an average pore diameter of 20-300 nm;
  within at least a portion of the pore volume of the porous glass, forming an aerogel precursor; and
  converting at least a portion of the aerogel precursor to an aerogel.

In certain embodiments as otherwise described herein, removing the phase-separated boron oxide domains comprises selectively leaching or etching in an aqueous solution for a period of time sufficient to remove at least 80 wt. % of the boron oxide domains of the phase-separated glass; and depositing the hydrophobic silane comprises exchanging the aqueous solution for an organic solution comprising the hydrophobic silane.

In certain embodiments as otherwise described herein, removing the phase-separated boron oxide domains comprises selectively leaching in an aqueous solution.

In certain embodiments as otherwise described herein, the aqueous solution has a pH of 6-8.

In certain embodiments as otherwise described herein, an amount of silicon oxide present in the porous glass is at least 90% of an amount of silicon oxide present in the phase-separated glass.

In certain embodiments as otherwise described herein, at least 2% of the surface of the porous glass comprises the hydrophobic silane layer.

In certain embodiments as otherwise described herein, the disposed hydrophobic silane layer is covalently linked to the phase-separated silicon oxide domains of the porous glass.

In certain embodiments as otherwise described herein, the porous glass has a total pore volume of 30-50 vol. %, and an average pore diameter of 75-250 nm.

In certain embodiments as otherwise described herein, forming the aerogel precursor comprises reacting a silicon alkoxide and water in the presence of a catalyst to produce a sol-gel.

In certain embodiments as otherwise described herein, the silicon alkoxide includes tetramethoxysilane or tetraethoxysilane.

In certain embodiments as otherwise described herein, converting the aerogel precursor comprises supercritical solvent extraction from the sol-gel.

In certain embodiments as otherwise described herein, the aerogel comprises at least 80 vol. % of the total pore volume of the porous glass.

In another aspect, the present disclosure provides a glass composition prepared by a method described herein.

In another aspect, the present disclosure provides a glass composition comprising an interpenetrating network of silicon oxide domains and aerogel domains, wherein
  the aerogel comprises 15-50 vol. % of the composition;
  the silicon oxide comprises 45-85 vol. % of the composition; and
  the average diameter of the aerogel domains is 20-300 nm.

In certain embodiments as otherwise described herein, the composition further comprises a hydrophobic silane, wherein the hydrophobic silane is present in the composition at an interface of at least a portion of the aerogel domains and the silicon oxide domains.

In certain embodiments as otherwise described herein, the hydrophobic silane is covalently linked to the silicon oxide.

In another aspect, the present disclosure provides an article comprising a glass composition described herein, the article having a major surface and a thickness perpendicular thereto, wherein the thickness is 0.5-20 mm.

In certain embodiments as otherwise described herein, the major surface has a water contact angle of at least 130°.

In certain embodiments as otherwise described herein, the major surface has an oil contact angle of at least 130°.

In certain embodiments as otherwise described herein, the article has a light transmissivity of at least 98% for wavelengths between 400 nm and 1,500 nm.

BRIEF DESCRIPTION OF THE DRAWINGS

FIG. 1 is a set of images depicting certain stages of a method according to one embodiment of the disclosure, including (A) a borosilicate glass before heating; (B) a phase-separated glass after heating, comprising an interpenetrating network of silicon oxide domains (black) and boron oxide domains (grey); (C) a phase-separated glass after further heating, comprising an interpenetrating network of silicon oxide domains (black) and boron oxide domains (grey); (D) a porous glass after leaching or etching, comprising silicon oxide domains (black) and pores (white); (E)

a glass composition after formation of an aerogel precursor, comprising silicon oxide domains (black) and aerogel precursor (dotted); and (F) a glass composition after converting the aerogel precursor, comprising silicon oxide domains (black) and aerogel (cross-hatched).

DETAILED DESCRIPTION

The following detailed description describes various features and functions of the disclosed methods, compositions, and structures. The illustrative embodiments described herein are not meant to be limiting. It will be readily understood that certain aspects of the disclosed methods, compositions, and structures can be arranged and combined in a wide variety of different configurations, all of which are contemplated herein.

A method for preparing an optically transparent, superomniphobic glass composition is described. "Superhydrophobic," as used herein, describes surfaces or coatings that have a water contact angle of at least about 130°. Also as used herein, "superoleophobic" describes surfaces or coatings that have an oil contact angle of at least about 130°. And as used herein, "superomniphobic" describes surfaces or coatings that have a water contact angle of at least about 130° and an oil contact angle of at least about 130°. Also as used herein, an "optically transparent" coating transmits at least about 90% of incident light (e.g., having a wavelength in the range of 400-1,500 nm).

In one aspect, the present disclosure provides a method for preparing a glass composition, including heating a borosilicate glass comprising 45-85 wt. % silicon oxide and 10-40 wt. % boron oxide to form a phase-separated glass comprising an interpenetrating network of silicon oxide domains and boron oxide domains. The method includes removing at least a portion of the boron oxide domains from the phase-separated glass and depositing a hydrophobic silane to provide a porous glass having a hydrophobic silane layer disposed on a portion of the surface thereof, a total pore volume of 15-50 vol. %, and an average pore diameter of 20-300 nm. The method includes, within at least a portion of the volume of the porous glass, forming an aerogel precursor, and converting at least a portion of the aerogel precursor to an aerogel.

As described above, the method includes heating a borosilicate glass comprising 45-85 wt. % silicon oxide and 10-40 wt. % boron oxide. As used herein, "oxide" describes oxides in all forms and crystalline phases. For example, "silicon oxide" includes $SiO_2$, $SiO_x$ where x is within the range of 1 to 3, etc. Unless otherwise indicated, regardless of the actual stoichiometry of the oxide, oxides are calculated as the most stable oxide for purposes of weight percent determinations. For example, the person of ordinary skill in the art will appreciate that a non-stoichiometric oxide of silicon, or even another form of silicon, may still be calculated as $SiO_2$. As used herein, "aerogel domains," "aerogel present as a domain," etc., can be used interchangeably and describe a discrete moiety comprising at least 50 wt. % (e.g., at least 75 wt. %, or at least 90 wt. %, or at least 95 wt. %) aerogel. Of course, aerogel domains can include other components such as, for example, binders, aerogel precursors, impurities, etc.

As described above, in one aspect of the disclosure, the borosilicate glass comprises 45-85 wt. % silicon oxide and 10-40 wt. % boron oxide. For example, in certain embodiments as otherwise described herein, the borosilicate glass comprises 45-75 wt. %, or 45-65 wt. %, or 45-55 wt. %, or 55-85 wt. %, or 65-85 wt. %, or 75-85 wt. %, or 50-80 wt. %, or 55-75 wt. %, or 60-70 wt. % silicon oxide. In another example, in certain embodiments as otherwise described herein, the borosilicate glass comprises 10-35 wt. %, or 10-30 wt. %, or 10-25 wt. %, or 10-20 wt. %, or 15-40 wt. %, or 20-40 wt. %, or 25-40 wt. %, or 30-40 wt. %, or 15-35 wt. %, or 20-30 wt. % boron oxide. In certain embodiments as otherwise described herein, the method includes heating a borosilicate glass comprising 45-70 wt. % silicon oxide and 15-40 wt. % boron oxide. In another example, in certain embodiments as otherwise described herein, the method includes heating a borosilicate glass comprising 45-60 wt. % silicon oxide and 20-40 wt. % boron oxide.

In certain embodiments as otherwise described herein, the borosilicate glass is an alkali-borosilicate glass. For example, in certain embodiments as otherwise described herein, the borosilicate glass comprises an alkali oxide (e.g., sodium oxide). In certain such embodiments, the borosilicate glass comprises 1-30 wt. %, e.g., 1-25 wt. %, or 1-20 wt. %, or 5-30 wt. %, or 10-30 wt. %, or 2.5-27.5 wt. %, or 5-25 wt. % sodium oxide. For example, in certain embodiments as otherwise described herein, the method includes heating a borosilicate glass comprising 45-70 wt. % silicon oxide, 15-40 wt. % boron oxide, and 5-30 wt. % sodium oxide. In another example, in certain embodiments as otherwise described herein, the method includes heating a borosilicate glass comprising 45-60 wt. % silicon oxide, 20-40 wt. % boron oxide, and 10-30 wt. % sodium oxide.

In certain embodiments as otherwise described herein, the borosilicate glass is optically transparent. For example, in certain embodiments as otherwise described herein, the borosilicate glass has a light transmissivity of at least 95% for wavelengths between 400 nm and 1,500 nm.

The present inventor notes that the method described herein is not particularly limited with respect to the physical dimensions of the borosilicate glass. Accordingly, the borosilicate glass (i.e., and the resulting glass composition) can advantageously be a "bulk" glass that is, for example, flat, curved, or otherwise shaped. For example, in certain embodiments as otherwise described herein, the borosilicate glass has a major surface and a thickness perpendicular thereto. In certain such embodiments, the thickness is 0.5-20 mm, e.g., 0.5-15 mm, or 0.5-10 mm, or 0.5-5 mm. In certain such embodiments, the major surface is substantially flat. In other embodiments, the major surface is curved or otherwise shaped. Of course, the method described herein is not limited only to bulk glass, and accordingly can, in certain embodiments, include heating a borosilicate glass having dimensions similar to those of a coating (e.g., having a thickness of less than 0.5 mm).

As described above, the method includes heating the borosilicate glass (e.g., FIG. 1A) to form a phase-separated glass comprising an interpenetrating network of silicon oxide domains and boron oxide domains (e.g., FIG. 1B, and after further heating, FIG. 1C). As used herein, "phase-separated domains" describe discrete moieties comprising substantially (e.g., at least 50 wt. %, or at least 75 wt. %, or at least 90 wt. %, or at least 95 wt. %) one phase of a precursor material. In certain embodiments as otherwise described herein, the method includes heating an alkali-borosilicate glass to form, by spinodal decomposition, a phase-separated glass comprising an interpenetrating network of amorphous silica domains and alkali borate domains.

In certain embodiments as otherwise described herein, the method includes heating the borosilicate glass at a temperature and for a period of time sufficient to form, by spinodal decomposition, boron oxide domains having an average size (e.g. the average minor dimension, or the average diameter) of 20-300 nm, e.g., 75-250 nm, or 100-200 nm. In certain such embodiments, the method includes heating the borosilicate glass to a temperature of at least 600° C., e.g., at least 650° C., or at least 700° C. In certain such embodiments, the method includes heating the borosilicate glass for 10 minutes to 8 hours, e.g., 1 hour to 6 hours, or 2 hours to 6 hours. In certain embodiments as otherwise described herein, heating the borosilicate glass comprises heating in an oven.

In certain embodiments as otherwise described herein, the phase-separated glass (i.e., after heating) comprises at least 80 wt. %, e.g., at least 90 wt. %, or at least 95 wt. % of a combined amount of phase-separated boron oxide domains and silicon oxide domains. For example, in certain such embodiments, the phase-separated glass comprises 80-99 wt. %, e.g., 90-99 wt. %, or 95-99 wt. % of a combined amount of phase-separated boron oxide domains and silicon oxide domains. In certain embodiments as otherwise described herein, the phase-separated glass comprises no more than 20 wt. % (e.g., no more than 10 wt. %, or no more than 5 wt. %) of an alkali-borosilicate glass, and includes at least 80 wt. % (e.g., at least 90 wt. %, or at least 95 wt. %) of a combined amount of alkali borate domains and amorphous silica domains.

In certain embodiments as otherwise described herein, the average size (e.g., the average minor dimension, or the average diameter) of the phase-separated boron oxide domains (e.g., alkali borate domains) is 20-300 nm, e.g., 75-300 nm, or 100-300 nm, or 125-300 nm, or 150-300 nm, or 175-300 nm, or 200-300 nm, or 50-250 nm, or 50-200 nm, or 75-250 nm, or 75-200 nm, or 50-150 nm, or 75-175 nm, or 100-200 nm, or 125-225 nm, or 150-250 nm, or 175-275 nm.

After forming the phase-separated glass, the method includes removing at least a portion of the boron oxide domains from the phase-separated glass to provide a porous glass (e.g., FIG. 1D). In certain embodiments as otherwise described herein, removing at least a portion of the boron oxide domains comprises selectively etching the boron oxide with an acidic solution (e.g., dilute HCl) or leaching the boron oxide into a liquid phase (e.g., water). As the person of ordinary skill in the art will appreciate, the pore size of the resulting material is related to the size of the removed boron oxide domains (compare, e.g., FIG. 1C and FIG. 1D).

The present inventor notes that leaching boron oxide from the phase-separated glass can remove substantially all of the phase-separated boron oxide domains while removing a minimal or even negligible amount of the phase-separated silicon oxide domains, providing a substantially silicon oxide material comprising pores having dimensions similar to those of the removed boron oxide domains. Accordingly, in certain embodiments as otherwise described herein, an amount of silicon oxide present in the porous glass is at least 90%, e.g., at least 95%, or at least 97.5%, or at least 98%, or at least 99% of an amount of silicon oxide present in the phase-separated glass.

In certain embodiments as otherwise described herein, removing the phase-separated boron oxide domains comprises selectively leaching at a temperature and for a period of time sufficient to remove at least 80 wt. % of the boron oxide domains of the phase-separated glass. In certain such embodiments, the method includes leaching the phase-separated boron oxide domains into an aqueous leaching solution (e.g., water) at a temperature of at least 80° C., e.g., at least 90° C., or at least 95° C., or boiling. In certain such embodiments, the method includes leaching the phase-separated boron oxide domains into an (e.g., boiling) aqueous leaching solution for a period of 30 minutes to 7 days, e.g., 1 hour to 2 days, or 2 hours to 2 days, or 2 days to 7 days.

For example, in certain embodiments, removing the phase-separated boron oxide domains comprises selectively leaching for a period of time sufficient to remove at least 85 wt. %, or at least 90 wt. %, or at least 95 wt. %, or at least 97.5 wt. %, or at least 98 wt. %, or at least 99 wt. % of the boron oxide domains of the phase-separated glass. As the person of ordinary skill in the art will appreciate, some phase-separated boron oxide domains may be inaccessible to a leaching solution. Accordingly, in certain desirable embodiments as otherwise described herein, substantially all (e.g., at least 97.5 wt. %, or at least 98 wt. %, or at least 99 wt. %) of solution-accessible boron oxide domains are removed from the phase-separated glass.

The present inventor notes that removal of a substantial portion of the boron oxide domains of the phase-separated glass provides pores having highly hydrophilic surfaces that, while stable in the presence of an aqueous etching or leaching solution, can collapse due to capillary forces upon drying. Advantageously, the present inventor has determined that, by depositing a hydrophobic silane layer onto the interior surface of the pores before completely removing a leaching solution or an (e.g., neutralized) etching solution, the porous glass can remain stable throughout and after drying.

In certain embodiments as otherwise described herein, depositing the hydrophobic silane comprises treating a portion of the surface of the porous glass (i.e., including the interior pore surface) with one or more compounds selected from organosilanes, fluorinated silanes, and disilazanes (e.g., before drying the porous glass). In certain embodiments as otherwise described herein, depositing the hydrophobic silane comprises covalently linking the hydrophobic silane to the phase-separated silicon oxide domains of the porous glass.

Suitable organosilanes include, but are not limited to alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, and polytriethoxysilane; trialkoxyarylsilanes; isooctyltrimethoxy-silane; N-(3-triethoxysilylpropyl) methoxyethoxyethoxy ethyl carbamate; N-(3-triethoxysilylpropyl)methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable fluorinated silanes include fluorinated alkyl-, alkoxy-, aryl- and/or alkylaryl-silanes, and fully perfluorinated alkyl-, alkoxy-, aryl- and/or alkylaryl-silanes. An example of a suitable fluorinated alkoxy-silane is perfluorooctyltrimethoxysilane.

Suitable disilazanes include, for example, hexamethyldisilazane, divinyltetramethyldisilazane and bis(3,3-trifluoropropyl)tetramethyldisilazane. Cyclosilazanes are also suitable, and include, for example, octamethylcyclotetrasilazane.

In certain embodiments as otherwise described herein, removing at least a portion of the boron oxide domains includes selectively leaching in an aqueous solution (e.g., for a period of time sufficient to remove at least 80 wt. % of the boron oxide domains of the phase-separated glass), and depositing the hydrophobic silane comprises exchanging the aqueous solution for an organic solution comprising the hydrophobic silane. In certain embodiments as otherwise described herein, removing at least a portion of the boron oxide domains includes selectively leaching in an aqueous solution (e.g., for a period of time sufficient to remove at least 80 wt. % of the boron oxide domains of the phase-separated glass), and depositing the hydrophobic silane comprises exchanging the aqueous solution for an organic solution, and then adding the hydrophobic silane to the organic solution.

In certain such embodiments, the aqueous leaching solution has a pH of 6-8, e.g., 6.5-7.5. In certain such embodiments, the aqueous leaching solution is contacted with the phase-separated glass at a temperature (e.g., at least 80° C., or at least 90° C., or at least 95° C., or boiling) and for a period of time (e.g., 30 minutes to 2 days, or 1 hour to 1.5 days, or 2 hours to 1 day, or 5 hours to 1 day) sufficient to remove at least 80 wt. %, e.g., at least 85 wt. %, or at least 90 wt. %, or at least 95 wt. %, or at least 97.5 wt. %, or at least 98 wt. %, or at least 99 wt. % of the boron oxide domains of the phase-separated glass.

In certain embodiments as otherwise described herein, removing at least a portion of the boron oxide domains includes selectively etching in an aqueous solution (e.g., for a period of time sufficient to remove at least 80 wt. % of the boron oxide domains of the phase-separated glass), and depositing the hydrophobic silane comprises exchanging the aqueous solution for an organic solution comprising the hydrophobic silane. In certain embodiments as otherwise described herein, removing at least a portion of the boron oxide domains includes selectively etching in an aqueous solution (e.g., for a period of time sufficient to remove at least 80 wt. % of the boron oxide domains of the phase-separated glass), and depositing the hydrophobic silane comprises exchanging the aqueous solution for an organic solution, and then adding the hydrophobic silane to the organic solution. Of course, in certain such embodiments, it may be necessary to adjust the composition of the aqueous etching solution (e.g., adjust the pH of the solution) before exchanging for the organic solution.

In certain embodiments as otherwise described herein, removing at least a portion of the boron oxide domains and depositing the hydrophobic silane includes selectively leaching in an aqueous solution comprising the hydrophobic silane (e.g., for a period of time sufficient to remove at least 80 wt. % of the boron oxide domains of the phase-separated glass). In such embodiments, the hydrophobic silane can be deposited onto a portion of the surface exposed by removing the boron oxide domains relatively quickly after removal (e.g., immediately after removal), or even simultaneously with removal.

As described above, removing at least a portion of the boron oxide domains from the phase separated glass and depositing a hydrophobic silane provides a porous glass having a hydrophobic silane layer disposed on a portion of the surface thereof, a total pore volume of 15-50 vol. %, and an average pore diameter of 20-300 nm. The present inventor notes that the porous glass (i.e., comprising the hydrophobic silane layer) can desirably be stable throughout drying (e.g., removal of the exchanged organic solution) as well as subsequent treatment (i.e., including aerogel precursor formation and conversion therefrom to aerogel).

In certain embodiments as otherwise described herein, the porous glass comprises at least 90 wt. %, e.g., at least 95 wt. %, or at least 97.5 wt. %, or at least 98 wt. %, or at least 99 wt. % silicon oxide. In certain such embodiments, the porous glass comprises no more than 5 wt. %, e.g., no more than 4 wt. %, or no more than 3 wt. %, or no more than 2 wt. %, or no more than 1 wt. % boron oxide.

In certain embodiments as otherwise described herein, at least 2%, e.g., at least 2.5%, or at least 3%, or at least 3.5%, or at least 4%, or at least 4.5%, or at least 5% of the surface (i.e., including interior pore surface) of the porous glass comprises the hydrophobic silane layer. In certain desirable embodiments as otherwise described herein, the hydrophobic silane layer is distributed substantially evenly across the surface (i.e., including interior pore surface) of the porous glass. In certain embodiments as otherwise described herein, the disposed hydrophobic silane layer is covalently linked to the phase-separated silicon oxide domains of the porous glass.

In certain embodiments as otherwise described herein, the porous glass has a total pore volume of 30-50 vol. %, e.g., 35-50 vol. %, or 40-50 vol. %, or 45-50 vol. %. In certain embodiments as otherwise described herein, the average pore diameter of the porous glass is 75-250 nm, e.g., 75-225 nm, or 75-200 nm, or 75-175 nm, or 75-150 nm, or 100-250 nm, or 125-250 nm, or 150-250 nm, or 100-200 nm, or 125-225 nm. For example, in certain embodiments as otherwise described herein, the porous glass has a total pore volume of 30-50 vol. % and an average pore diameter of 75-250 nm. In another example, in certain embodiments as otherwise described herein, the porous glass has a total pore volume of 40-50 vol. % and an average pore diameter of 100-200 nm.

The present inventor has determined that aerogel, which is ultralight and can be hydro- and oleo-phobic and have significant compressive strength, can be formed in situ within the pore volume of the porous glass, to provide a relatively lightweight glass composition having improved omniphobicity and durability. The present inventor notes that aerogel so formed can advantageously be protected from shear forces within the pores, while only minimally (or even negligibly) affecting the index of refraction of the material (i.e., due to the particularly low density of aerogel).

Accordingly, the method includes, within at least a portion of the pore volume of the porous glass, forming an aerogel precursor (e.g., FIG. 1E), and converting at least a portion of the aerogel precursor to an aerogel (e.g., FIG. 1F). Of course, in certain embodiments, the porous glass (i.e., after removing at least a portion of the boron oxide domains and depositing a hydrophobic silane) can be prepared for aerogel precursor formation by, e.g., one or more drying and/or washing steps.

In certain desirable embodiments as otherwise described herein, the aerogel is a silica aerogel. The present inventor notes that, desirably, silica aerogels can be highly compatible with the silane-functionalized surface of the porous glass, and accordingly can contribute to the structural stability of the porous glass. Of course, the aerogel can be a type other than silica, such as, for example, a metal oxide aerogel or an organic aerogel.

In certain embodiments, the aerogel precursor is a sol-gel, and forming the aerogel precursor comprises reacting a silicon alkoxide and water in the presence of a catalyst to produce the sol-gel. For example, in certain such embodiments, forming the sol-gel comprises disposing a first solution including the silicon alkoxide and a second solution including the water and catalyst within at least a portion of the pore volume of the porous glass, and allowing the silicon oxide to react with water and polymerize into a gel.

In certain embodiments as otherwise described herein, the silicon alkoxide includes tetramethoxysilane or tetraethoxy silane. In certain embodiments as otherwise described herein, the catalyst includes ammonium hydroxide or ammonium fluoride. For example, in certain embodiments as otherwise described herein, the silicon alkoxide is tetraethoxy silane, and the catalyst is ammonium fluoride. In certain embodiments as otherwise described herein, the silicon alkoxide, catalyst, and water are reacted in an alcohol solvent (e.g., ethanol).

The present inventor notes that, by forming the aerogel precursor (e.g., a sol-gel) in situ within the pores of the porous glass, the produced sol-gel can comprise a substantial portion of the pore volume of the porous glass. For example, in certain desirable embodiments as otherwise described herein, the sol-gel comprises at least 80 vol. %, e.g., at least 85 vol. %, or at least 90 vol. %, or at least 95 vol. % of the total pore volume of the porous glass.

In certain embodiments as otherwise described herein, the aerogel precursor is a sol-gel, and converting at least a portion of the aerogel precursor to an aerogel comprises supercritical solvent extraction from the sol-gel. As the person of ordinary skill in the art will appreciate, supercritical solvent extraction can remove liquid from the sol-gel without substantially damaging the pore structure of the gel (e.g., the pore structure of polymerized tetraethoxy silane or tetramethoxy silane).

Of course, in certain embodiments, the sol-gel can be prepared for solvent extraction by, e.g., one or more washing and/or solvent-exchange steps. For example, in certain embodiments, the sol-gel is washed with ethanol and then solvent-exchanged into $CO_2$.

Accordingly, in certain such embodiments, converting at least a portion of the sol-gel to an aerogel comprises supercritical solvent extraction sufficient convert at least 90 wt. %, e.g., at least 95 wt. %, or at least 97.5 wt. %, or at least 98 wt. %, or at least 99 wt. % of the sol-gel present within the pore volume of the porous glass into an aerogel. In certain embodiments as otherwise described herein, the aerogel comprises at least 80 vol. %, e.g., at least 85 vol. %, or at least 90 vol. %, or at least 95 vol. % of the total pore volume of the porous glass.

The methods described herein can desirably provide an optically transparent, superomniphobic bulk glass composition. Accordingly, another aspect of the disclosure is a glass composition (e.g., prepared according to a method described herein) comprising an interpenetrating network of silicon oxide domains and aerogel domains, the aerogel comprising 15-50 vol. % of the composition, the silicon oxide comprising 45-80 vol. % of the composition, and the aerogel domains having an average size (e.g. the average minor dimension, or the average diameter) of 20-300 nm. The properties of the various components of the composition can be as otherwise described above with respect to the methods of the disclosure.

For example, in certain embodiments as otherwise described herein, the aerogel comprises 30-50 vol. %, e.g., 40-50 vol. % of the glass composition. In certain such embodiments, the silicon oxide comprises 50-70 vol. %, e.g., 50-60 vol. % of the glass composition. In certain such embodiments, the average size of the aerogel domains is 75-250 nm, e.g., 100-200 nm.

In certain embodiments as otherwise described herein, the glass composition comprises a hydrophobic silane, present in the composition at an interface of a portion of the aerogel domains and the silicon oxide domains. In certain such embodiments, the hydrophobic silane is covalently linked to the silicon oxide.

Another aspect of the disclosure is an article comprising a glass composition described herein (e.g., prepared according to a method described herein), the article having a major surface and a thickness perpendicular thereto. The thickness of the article is 0.5-20 mm, e.g., 0.5-17.5 mm, or 0.5-15 mm, or 0.5-12.5 mm, or 0.5-10 mm, or 1-17.5 mm, or 1-15 mm, or 1-12.5 mm, or 1-10 mm. In certain embodiments, the major surface is substantially flat. In other embodiments, the major surface is curved or otherwise shaped.

In certain embodiments as otherwise described herein, the major surface has a water contact angle of at least 130°, e.g., at least 140°, or at least 150° In certain embodiments as otherwise described herein, the major surface has an oil contact angle of at least 130°, e.g., at least 140°, or at least 150°.

In certain embodiments as otherwise described herein, the article has a light transmissivity of at least 98%, e.g., at least 99% or at least 99.5% for wavelengths between 400 nm and 1,500 nm.

The invention claimed is:

1. A method for preparing a glass composition, comprising
   heating a borosilicate glass comprising 45-85 wt. % silicon oxide and 10-40 wt. % boron oxide to form a phase-separated glass comprising an interpenetrating network of silicon oxide domains and boron oxide domains;
   removing at least a portion of the boron oxide domains from the phase-separated glass and depositing a hydrophobic silane to provide a porous glass having
      a hydrophobic silane layer disposed on a portion of the surface thereof;
      a total pore volume of 15-50 vol. %; and
      an average pore diameter of 20-300 nm;
   within at least a portion of the pore volume of the porous glass, forming an aerogel precursor; and
   converting at least a portion of the aerogel precursor to an aerogel.

2. The method of claim 1, wherein
   removing the phase-separated boron oxide domains comprises selectively leaching or etching in an aqueous solution for a period of time sufficient to remove at least 80 wt. % of the boron oxide domains of the phase-separated glass; and
   depositing the hydrophobic silane comprises exchanging the aqueous solution for an organic solution comprising the hydrophobic silane.

3. The method of claim 2, wherein removing the phase-separated boron oxide domains comprises selectively leaching in an aqueous solution.

4. The method of claim 3, wherein the aqueous solution has a pH of 6-8.

5. The method of claim 1, wherein an amount of silicon oxide present in the porous glass is at least 90% of an amount of silicon oxide present in the phase-separated glass.

6. The method of claim 1, wherein at least 2% of the surface of the porous glass comprises the hydrophobic silane layer.

7. The method of claim 1, wherein the disposed hydrophobic silane layer is covalently linked to the phase-separated silicon oxide domains of the porous glass.

8. The method of claim 1, wherein the porous glass has a total pore volume of 30-50 vol. %, and an average pore diameter of 75-250 nm.

9. The method of claim 1, wherein forming the aerogel precursor comprises reacting a silicon alkoxide and water in the presence of a catalyst to produce a sol-gel.

10. The method of claim 9, wherein the silicon alkoxide includes tetramethoxysilane or tetraethoxysilane.

11. The method of claim 9, wherein converting the aerogel precursor comprises supercritical solvent extraction from the sol-gel.

12. The method of claim 1, wherein the aerogel comprises at least 80 vol. % of the total pore volume of the porous glass.

13. A glass composition prepared according to a method comprising:
   heating a borosilicate glass comprising 45-85 wt. % silicon oxide and 10-40 wt. % boron oxide to form a phase-separated glass comprising an interpenetrating network of silicon oxide domains and boron oxide domains;
   removing at least a portion of the boron oxide domains from the phase-separated glass and depositing a hydrophobic silane to provide a porous glass having
      a hydrophobic silane layer disposed on a portion of the surface thereof;
      a total pore volume of 15-50 vol. %; and
      an average pore diameter of 20-300 nm;
   within at least a portion of the pore volume of the porous glass, forming an aerogel precursor; and
   converting at least a portion of the aerogel precursor to an aerogel.

14. A glass composition comprising an interpenetrating network of silicon oxide domains and aerogel domains, wherein
   the aerogel comprises 15-50 vol. % of the composition;
   the silicon oxide comprises 45-85 vol. % of the composition; and
   the average size of the aerogel domains is 20-300 nm.

15. The composition of claim 14, further comprising a hydrophobic silane, wherein the hydrophobic silane is present in the composition at an interface of at least a portion of the aerogel domains and the silicon oxide domains.

16. The composition of claim 15, wherein the hydrophobic silane is covalently linked to the silicon oxide.

17. An article comprising the glass composition of claim 14, the article having a major surface and a thickness perpendicular thereto, wherein the thickness is 0.5-20 mm.

18. The article of claim 17, wherein the major surface has a water contact angle of at least 130°.

19. The article of claim 17, wherein the major surface has an oil contact angle of at least 130°.

20. The article of claim 17, having a light transmissivity of at least 98% for wavelengths between 400 nm and 1,500 nm.

* * * * *